United States Patent [19]
Swin et al.

[11] 3,815,015
[45] June 4, 1974

[54] TRANSFORMER-DIODE ISOLATED CIRCUITS FOR HIGH VOLTAGE POWER SUPPLIES

[75] Inventors: William A. Swin; Flavian Reising, Jr., both of Fort Wayne, Ind.

[73] Assignee: General Electric Company, Indianapolis, Ind.

[22] Filed: Feb. 20, 1973

[21] Appl. No.: 334,046

[52] U.S. Cl............... 323/22 T, 307/24, 307/28, 307/75, 321/2, 321/15, 323/8, 323/25
[51] Int. Cl............................................ G05f 1/48
[58] Field of Search............ 307/17, 24, 25, 28, 30, 307/34, 38, 39, 60, 75, 83; 321/2, 15, 18; 323/4, 6, 8, 22 T, 23, 25, 38, 62

[56] References Cited
UNITED STATES PATENTS

| | | | |
|---|---|---|---|
| 3,551,777 | 12/1970 | Bingley | 321/18 X |
| 3,569,818 | 3/1971 | Dahlinger et al. | 307/17 X |
| 3,600,598 | 8/1971 | Foerster | 307/28 X |
| 3,619,758 | 11/1971 | Deranian | 307/60 X |
| 3,624,405 | 11/1971 | Bishop et al. | 323/6 X |
| 3,657,631 | 4/1972 | Martens et al. | 321/18 X |
| 3,660,749 | 5/1972 | Kadri | 321/18 X |

*Primary Examiner*—A. D. Pellinen

[57] ABSTRACT

An improved power supply having a single input stage which operates a plurality of output stages. The input stage includes an isolation transformer or a push-pull drive circuit. This input stage controls a plurality of regulated output stages. The output stages may include either series or shunt regulators, however, at least one of the output stages includes a series regulator. The series regulated output stage includes a center tap transformer having a transistor connected to the center tap. The output voltage or current is sensed and fed back to the base of the transistor to regulate and keep constant the output voltage or current. A pair of rectifiers are connected between the series regulated output stage and the other output stages to provide isolation between the series regulated output stage and the other output stages.

7 Claims, 2 Drawing Figures

TRANSFORMER-DIODE ISOLATED CIRCUITS FOR HIGH VOLTAGE POWER SUPPLIES

BACKGROUND OF THE INVENTION

This invention relates to an improved regulated power supply circuit having multiple independent output stages. More particularly it relates to a regulated power supply having multiple output stages driven by a single input stage wherein the regulated output stages are electrically isolated.

A power supply having a single output terminal has been regulated by a regulation circuit including a feedback network connected from the output terminal to a regulation transistor. The regulation transistor was further connected to the primary winding of a step-up transformer. This primary winding was also connected to an AC or square wave driving source. The secondary winding of the step-up transformer was also connected to a voltage doubler which converted the AC to DC and thus a DC output signal was obtained. The DC output signal was sensed by a sensing resistor and fed back to the regulation transistor as variations in the output signal occurred.

When a plurality of output signals were desired, separate isolation transformer secondaries or separate push-pull oscillators were needed for each output stage to isolate the output stages. This was true because the outputs desired might be of different voltage or current levels which would interact with one another if a common secondary or push-pull input stage was used. It was often desired to use the same DC operating power source. Problems arose from the interaction between the output stages when they were not isolated properly. Most problems occurred when the output voltages or currents were to be at different levels. Where some of the output stages included center tap transformers having a common operating voltage source connected to the primary winding, large voltage differences existed between some of the primary windings. Voltage differences could also occur when different operating voltage sources were used. Where at least one of the transformer primaries was regulated by a series regulation method, that is, by a transistor connected in series between the center tap of the transformer primary winding and the operating voltage source, problems arose. Where it was desired, for example, to drop half of this voltage across the regulation transistor and thereby induce only half of the voltage from the primary winding into a secondary winding, there resulted a net voltage on one side of the series regulated primary with respect to a non-series regulated primary. This caused a current flow in the direction from one primary winding to the other primary winding. This current flow would induce voltages into the secondary of the series regulated stage causing fluctuation in the output. Constant current or constant voltage outputs were, therefore, difficult to achieve. A method, therefore, was needed to isolate the output stages from one another to eliminate this voltage interaction without the expense of using multiple input stages.

SUMMARY OF THE INVENTION

Accordingly it is a general object of this invention to provide a regulated power supply having a plurality of independent output stages.

Another object is to provide a regulated power supply having multiple output stages wherein at least one output stage utilizes series regulation and wherein the at least one series regulated output stage is isolated from all of the other output stages.

Another object of the invention is to provide a high voltage DC power supply having a plurality of output stages operated by a single input stage wherein the output stages are substantially isolated from one another.

In accordance with one form of the present invention there is provided a power supply for operating a plurality of output stages from a single input stage including an input stage connected to a source of power. The plurality of output stages includes at least one series regulated stage. At least one unidirectional blocking device is connected between a series regulated output stage and the other output stages, enabling the series regulated output stage to be electrically isolated from the other output stages.

BRIEF DESCRIPTION OF THE DRAWINGS

The subject matter which is regarded as the invention is set forth in the appended claims. The invention, itself, however, together with further objects and advantages thereof may be better understood by reference to the following description taken in conjunction with the accompanying drawings in which:

DESCRIPTION OF THE PREFERRED EMBODIMENT

Figures 1, 2:
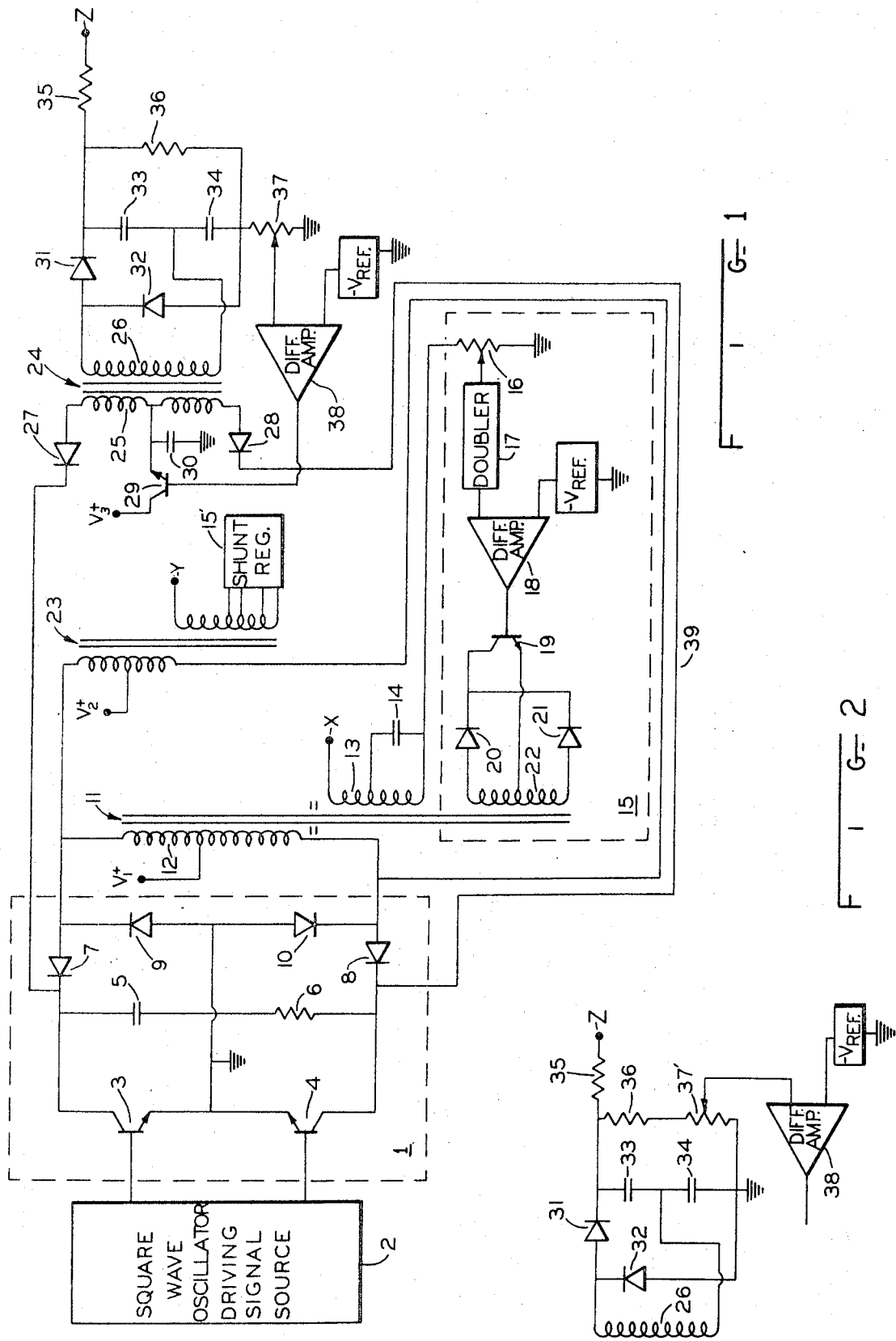
FIG. 1 is a schematic circuit diagram of one embodiment of the improved regulated power supply circuit.
FIG. 2 is a schematic circuit diagram showing a part of another embodiment of the improved regulated power supply.

Referring more particularly to FIG. 1, the improved regulated power supply circuit includes an input stage denoted by block 1 and a plurality of output stages having output terminals denoted as X, Y and Z. The input stage, in the exemplification embodiment, is driven by square-wave oscillator driving signal source 2, of a type well known in the art, connected to a push-pull switching circuit. This push-pull circuit includes transistors 3 and 4 each having its base connected to the square-wave oscillator drive circuit. The emitter of transistors 3 and 4 are connected together and to a common ground. Capacitor 5 and resistor 6 are connected across the collectors of the transistors 3 and 4 and provide transient overvoltage protection. Diode 7 is connected to collector of transistor 3 and diode 8 is connected to the collector of transistor 4 and are poled in such a direction to prevent a strong reverse current from destroying the transistors. Diode 9 has its cathode connected to the anode of diode 7 and diode 10 has its cathode connected to the anode of diode 8. The anodes of diodes 9 and 10 are connected to ground and provide paths for negative currents to ground.

A first output stage includes transformer 11 having primary winding 12 center tapped and connected to operating voltage source $V_1+$. The upper half of the primary is energized by $V_1+$ when transistor 3 conducts and the lower half is energized when transistor 4 conducts. Secondary winding 13 is loosely coupled to primary 12 and has output terminal X connected to the secondary winding. Capacitor 14 is connected to secondary 13 to create a resonant condition with the inductive component of transformer 11. The first output stage utilizes shunt regulator 15. An output current sensing resistor 16 is connected as a potentiometer across secondary winding 13 and ground. The tap is connected to a standard half-wave doubler 17. A comparator circuit which operates as a linear device comparying two signals and which, in the exemplification embodiment, is differential amplifier 18 is connected to the half-wave doubler and to a reference voltage $-V_{ref}$. The differential amplifier drives the base of transistor 19 which is connected to the output terminal of differential amplifier. Diodes 20 and 21 are connected to the collector of transistor 19 and to feedback winding 22. This feedback winding 22 is tightly coupled to secondary 13. As transistor 3 conducts, some of the voltage from primary 12 is induced into feedback winding 22 instead of all of this voltage induced into secondary winding 13. Shunt regulation of this output stage is thus obtained.

The second output stage, which includes a transformer 23 is also connected to the input stage through diodes 7 and 8. The second output stage utilizes a shunt regulator shown in block 15' which hich is similar to shunt regulator 15. Transformer 23 may be energized by $V_2+$. The second output stage operates in a similar manner to the first output stage.

The third output stage includes transformer 24 having primary winding 25 and secondary winding 26. Primary winding 25 is connected to the push-pull oscillator circuit through diode rectifier 27 and 28 respectively. Diodes 27 and 28 are also connected between the third output stage and the other output stages. These diodes are isolation diodes which are poled to prevent electrical interaction between the other output stages and the third output stage. Diode rectifier 27 and 28 may be replaced by other means to provide unidirectional current blocking. The third output stage is series regulated by transistor 29, having its emitter connected to center tap of primary 25 and to storage capacitor 30. The other side of capacitor 30 is connected to ground. Transistor 29 has its collector connected to voltage source $V_3+$ which may be the same source as the one connected to transformers 11 and 23. Transistor 29 is regulated by a feedback voltage applied to its base as will be explained later. Secondary winding 26 is connected to a full-wave doubler including diodes 31, 32 and output capacitors 33 and 34. Diode 31 has its anode connected to one side of secondary winding 26 and its cathode connected to capacitor 33. Capacitor 33 is connected to capacitor 34 and to the other side of secondary winding 26. Diode 32 is connected to the anode of diode 31 and to capacitor 34. Resistor 35 is connected to the cathode of diode 31 and to an output terminal Z. Resistor 36 is connected across capacitors 33 and 34 and acts as a slow bleeder.

The regulation circuit includes current sensing feedback potentiometer 37 connected to capacitor 34 and resistor 36 and to ground. The tap of the potentiometer is connected to one input of a signal comparator which is differential amplifier 38. The other input of the differential amplifier is connected to a reference voltage source $-V_{ref}$. The output terminal of the differential amplifier 38 is further connected to the base of transistor 29. The differential amplifier biases transistor 29 into a lesser conduction level as the current in the output terminal Z increases and to a greater conduction level as the current decreases. Thus, an approximate constant current output is obtained. Potentiometer 37 may be set to adjust the level of output current desired.

FIG. 2 shows, in part, the third output stage utilizing potentiometer 37 as a voltage sensing means rather than current sensing. In this embodiment the voltage doubler network is connected directly to ground as well as potentiometer 37'.

In operation, square-wave oscillator 2 applies alternate positive and negative square-waves to transistors 3 and 4. When a positive base drive is received at the base of transistor 3, transistor 3 conducts and the current flows from $V_1+$ supply through the top part of primary winding 12 through diode 7 and through the collector-emitter path of transistor 3 and to ground. The operation is similar for the conduction of transistor 4 except that the lower half of the first output stage provides the conduction path. Since the top and bottom of transformer primary winding 12 are closely coupled the top winding and bottom winding alternatively will induce to $2V+$ at the tops and bottoms of the transformer respectively. A voltage is induced into the secondary 13 and an output signal appears at output terminal X. If the output current is above the desired level, as determined by the reference voltage $-V_{ref}$ and the adjustment of the variable resistor 16, feedback winding 22 will shunt some of the induced current away from the secondary winding 13. This current is induced into winding 22 and travels through the diodes 20 and 21 and through collector-emitter path of transistor 19. If the output current level is too low then less current is induced into feedback winding 22.

The second output stage operates substantially the same as the first output stage in that it also uses a similar shunt regulator circuit. The second output stage could, however, be operated without operating voltage source $V_2+$. Operating voltage for this stage could be furnished by $V_1+$ with primary 12 closely coupled to the primary of transformer 23.

The third output stage utilizes a series regulator circuit. When transistor 3 conducts and transistor 29 is biased to conduction, a current flows from $V_3+$ through the collector-emitter of transistor 29 through the top of primary winding 25 through diodes 27 through transistor 3 to ground. When the transistor 4 is biased into conduction the current then flows from $V_3+$ through the bottom part of primary winding 25 through diode 28 and transistor 4 to ground. This induces a voltage into the secondary winding 26. This AC voltage is converted to DC by the voltage doubler which results in a DC voltage at output terminal Z. Feedback resistor 37 senses the current and it is compared to a reference voltage by comparator or differential amplifier 38 and this in turn controls the amount of conduction of transistor 29.

In this manner each output is individually controlled by its own feedback circuit such that the output levels or current levels could be different for each output circuit. For example, if it is desired for transistor 29 to drop $+V_3/2$ volts across itself, and transistor 3 is conducting current through the top part of primary winding 25, a voltage of $V_3+$ would be induced to the bottom of primary winding 25. However, full voltage $V_1+$ is present at the center tap of primary winding 12, therefore at the bottom of primary winding 12, while 3 is conducting, a voltage of $2V_1+$ is present since the top and bottom of this winding are closely coupled. This means that there is a voltage difference of $2V_1+$ minus $V_3+$ on line 39. However, these voltages are isolated from one another by diode 28 and it is poled in such a direction that current cannot flow due to this voltage difference, since the positive voltage is on the cathode of the diode. This means that the third or series regulated output stage will not electrically interfere with the regulation of the other output stages nor will the other output stages interfere with the third output stage. The same situation occurs when transistor 4 is conducting wherein diode 27 is poled in such a direction to prevent such interaction between the same two stages. Thus the stage, in the exemplification embodiment, utilizing series regulation is isolated from all of the other stages in the power supply. Furthermore, diodes 27 and 28 prevent reverse current flow through transistor 29. It should be noted that $V_1+$, and $V_2+$, and $V_3+$ may or may not be equal and that the voltage sources indicated as $-V_{ref}$ may or may not be equal.

A circuit as set forth in FIG. 1 has been built and operated with components having the following values:

Transistors 3, 4 — 2N3055
Transistors 19, 29 — 2N5294
Diodes 7, 8, 9, 10 — 3A, 100V
Diodes 27, 28, 20, 21 — 1A, 200V
Diodes 31 32 — 5 ma., 20KV
Capacitor 5 — 0.22mf, 200V DC
Capacitor 14 — 0.02mf, 1,600V DC
Capacitor 30 — 22mf, 50KV DC
Capacitor 33 34 — 0.04mf, 5,500V DC
Resistor 6 — 22 ohms, 5%, 2W
Resistor 16 37 — 50K ohms, potentiometer
Resistor 35 — 75K ohms 10W
Resistor 36 — 100M ohms High Voltage (10KV) resistor
Transformer 11 — Transformer (High Reactance)
Primary 12 — 150 turns Bifilar wound (0.0226 inch dia. wire)
Secondary 13 — 20,000 turns with tap at 1,100 turns (0.0056 inch dia. wire)
Secondary 22 — 180 turns with tap at 90 turns (0.01 inch dia. wire)
Signal Source 2 — Square wave oscillator circuit (Conventional 600Hz square wave oscillator)
Transformer 23 — Identical to transformer 11
Transformer 24
Primary 25 — 85 turns, bifilar wound (0.0226 inch dia. wire)
Secondary 26 — 16,450 turns (0.0025 inch dia. wire)

$-V_{ref}$ — Voltage Reference — 1N751A zener diode

Amplifier 18 38 — Differential amplifier using 2N3859A transistors

From the foregoing description of the embodiment of the invention it will be apparent that many modifications may be made therein. It will be understood, however, that these embodiments if the invention are intended as exemplification of the invention only and that the invention is not limited thereto. For example, a different type of input stage other than a push-pull oscillator could be used such as an isolation transformer. It is to be understood, therefore, that it is intended in the appended claims to cover all the modifications as fall within the true spirit and scope of the invention.

What we claim as new and desire to secure by letters Patent of the United States is:

1. A power supply for operating a plurality of output stages from a single input stage comprising:
   an input stage for providing driving voltage;
   a plurality of output stages connected to said input stage;
   output terminals connected to each of said output stages; at least one of said output stages including a series regulator; each of said output stages including a transformer having primary and secondary windings, said primary winding of said series regulated output stage having a tapped portion;
   said series regulated output stage further including a transistor having first, second and third terminals, said first terminal being connected to said tapped portion of said primary winding of said series regulated output stage; means for connecting said second terminal of said transistor to a source of operating voltage; feedback control means connected to said third terminal of said transistor; at least one unidirectional current blocking means connected between said at least one series regulated output stage and at least another output stage whereby said at least one series regulated output stage is electrically isolated from said at least another output stage.

2. A power supply circuit as set forth in claim 1 further including means for connecting a second source of operating voltage to said another output stage primary winding.

3. A power supply circuit as set forth in claim 1 wherein said feedback control means includes a comparator having a first and second input terminals and an output terminal, means for connecting said first input terminal to a reference signal source, said second input terminal connected to said output terminal of said series regulated output stage, said output terminal connected to said third terminal of said transistor, whereby the conduction level of said transistor being determined by the relative signal levels on said first and second input terminals.

4. A power supply circuit as set forth in claim 3 further including voltage sensing means connected between said output terminal of said series regulated output stage and said second input terminal of said comparator, whereby the output voltage of said series regulated output stage may be made substantially constant.

5. A power supply circuit as set forth in claim 3 further including a current sensing means connected between said output terminal of said series regulated output stage and said second input terminal of said comparator, whereby the output current of said series regulated output stage may be made substantially constant.

6. A power supply circuit as set forth in claim 1 wherein said unidirection current blocking means includes at least one rectifier.

7. A power supply circuit for providing regulated multiple outputs comprising:
   input means for connecting the circuit to a source driving voltage; a push-pull oscillator connected to said input means; a first transformer having at least primary and secondary windings, said first transformer indirectly connected to said push-pull oscillator; means for connecting a source of operating voltage to said first transformer primary winding; a second transformer having primary, secondary, and feedback windings, said second transformer primary winding being connected to said push-pull oscillator; first and second rectifiers, said first rectifier being indirectly connected between one side of said first transformer primary winding and one side of said second transformer primary winding, said second rectifier being connected between the other side of said first transformer primary winding and the other side of said second transformer primary winding; said pair of rectifiers being poled in such a direction for preventing electrical interaction between said first transformer primary winding and said second transformer primary winding; signal sensing means connected to said second transformer secondary winding; signal comparator means connected to said signal sensing means for comparing the signal on said second transformer secondary winding to a reference signal; a transistor having first, second, and third terminals, said first terminal being connected to said means for connecting a source of operating voltage, said second terminal being connected to said second transformer primary winding; said third terminal being connected to said comparator means whereby the signal on said second transformer primary winding is regulated.

* * * * *

Dedication 3,815,015.—*William A. Swin* and *Flavian Reising, Jr.*, Fort Wayne, Ind. TRANSFORMER-DIODE ISOLATED CIRCUITS FOR HIGH VOLTAGE POWER SUPPLIES. Patent dated June 4, 1974. Dedication filed Oct. 17, 1977, by the assignee, *General Electric Company*.

Hereby dedicates to the Public the above-identified patent.

[*Official Gazette September 12, 1978.*]